United States Patent [19]

Oyama

[11] 4,219,522
[45] Aug. 26, 1980

[54] METHOD OF MANUFACTURING REINFORCED PLASTIC HOSES

[75] Inventor: Hiroichi Oyama, Yokohama, Japan

[73] Assignee: Bridgestone Tire Company Limited, Tokyo, Japan

[21] Appl. No.: 971,132

[22] Filed: Dec. 19, 1978

[30] Foreign Application Priority Data

Dec. 23, 1977 [JP] Japan .................... 52-154301

[51] Int. Cl.$^2$ .................... B29C 17/00; B29D 23/05
[52] U.S. Cl. .................... 264/173; 29/460; 264/174; 264/229; 264/254; 264/255; 264/266; 264/271; 264/279; 264/280; 264/322
[58] Field of Search .............. 264/286, 287, 171, 284, 264/210 R, 25, 26, 173, 174, 209, 210.1, 250, 255, 259, 320, 271, 279, 229, 254, 103; 29/460; 138/144, 145, 153, 174

[56] References Cited

U.S. PATENT DOCUMENTS

| | | | |
|---|---|---|---|
| 3,021,245 | 2/1962 | Roberts et al. | 264/286 |
| 3,701,702 | 10/1972 | Schichman et al. | 264/25 |
| 4,091,063 | 5/1978 | Logan | 264/103 |
| 4,102,955 | 7/1978 | Baker et al. | 264/25 |

*Primary Examiner*—W. E. Hoag
*Attorney, Agent, or Firm*—Sughrue, Rothwell, Mion, Zinn and Macpeak

[57] ABSTRACT

A method of manufacturing reinforced plastic hoses comprising extruding and shaping plastic material into a plastic tube which is provided around its outer surface with a serrated portion, heating said plastic tube so as to soften said serrated portion, and covering the outer surface of said plastic tube with a reinforcing layer.

2 Claims, 6 Drawing Figures

FIG. 1
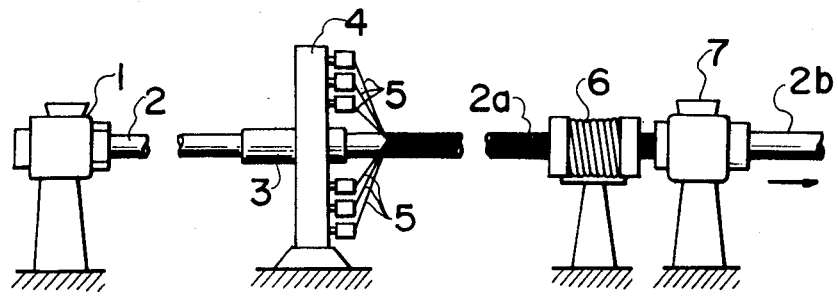
FIG. 2
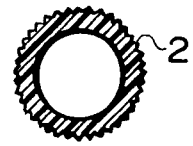
FIG. 3a
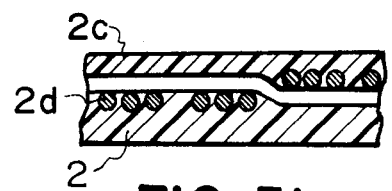
FIG. 4a
PRIOR ART
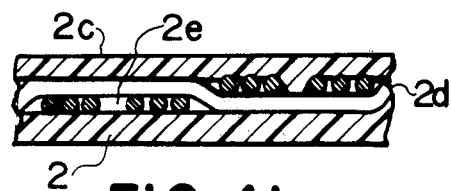
FIG. 3b
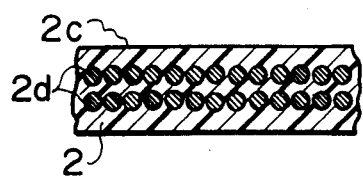
FIG. 4b
PRIOR ART

METHOD OF MANUFACTURING REINFORCED PLASTIC HOSES

BACKGROUND OF THE INVENTION

1. Field of the Invention

This invention relates to a method of manufacturing reinforced plastic hoses and more particularly a reinforced plastic hose having an inner diameter of 3 to 50 mm and adapted to be used under an oil pressure, pneumatic pressure or the like pressure.

2. Description of the Prior Art

In manufacturing the above mentioned kind of reinforced plastic hose, it has been the common practice to reinforce a plastic tube having a flat and smooth surface with a hard steel wire by spirally winding it around the plastic tube or by weaving it into a bag-shaped braid. In such reinforcing method, the wire tends to be easily slip along the tube surface and it is difficult to bond the tube formed of polyamide, polyester or polyurethane with the wire. As a result, such conventional method of manufacturing the reinforced plastic hose has a number of drawbacks.

1. A row of wires arranged along the tube surface becomes disordered, so that it is difficult to provide a uniform wire arrangement having a given pitch.

2. The amount of displacement of the wire is large when the hose is inflated by applying internal pressure and the mutual friction between the wires induces a premature fatigue failure of the wire.

3. In the case of cutting the hose into sections, the wire end at the cut surface of the hose section becomes outwardly enlarged due to resilient restoring force thereof, so that it is difficult to mount a metal fitting on the hose section.

4. Particularly, if the hose is covered with an outer layer, it is impossible to completely remove air from the reinforcing layer or to prevent damage of the outer layer produced when, in use, water easily penetrates into the reinforcing layer, thereby frequently coating it with rust.

SUMMARY OF THE INVENTION

An object of the invention, therefore, is to provide a method of manufacturing reinforced plastic hoses which can conveniently eliminate the above mentioned drawbacks which have been encountered with the prior art techniques.

A feature of the invention is the provision of a method of manufacturing reinforced plastic hoses comprising extruding and shaping plastic material into a plastic tube which is provided around its outer surface with a serrated portion, heating said plastic tube so as to soften said serrated portion, and covering the serrated outer surface of said plastic tube with a reinforcing layer.

Further objects and features of the invention will be fully understood from the following detailed description with reference to the accompanying drawings, wherein:

BRIEF EXPLANATION OF THE DRAWINGS

FIG. 1 is a diagrammatic front elevational view illustrating successive steps of one embodiment of a method of manufacturing reinforced plastic hoses according to the invention;

FIG. 2 is a cross-sectional view of a plastic tube;

FIGS. 3a and 3b are longitudinal sectional views of reinforced plastic hoses manufactured by the method according to the invention; and FIGS. 4a and 4b are similar longitudinal sectional views of reinforced plastic hoses manufactured by a conventional method.

DETAILED DESCRIPTION OF THE PREFERRED EMBODIMENTS

In one embodiment of a method according to the invention shown in FIG. 1, raw material such as polyamide, polyester or polyurethane is extruded from a plastic tuber 1 to form a plastic tube 2 provided around its outer surface with a serrated portion.

It is a matter of course that the serrated portion on the outer surface of the plastic tube 2 may take any shape and arrangement. For example, the serrated portion on the outer surface of the plastic tube 2 may preferably be composed of inverted V-shaped ridges and V-shaped grooves both extending in the axial direction of the tube as shown in FIG. 2.

Then, the tube 2 is fed into a heater 3 where the tube 2 is heated by infrared rays, high frequency or the like to soften the ridge portion. Immediately thereafter, the tube 2 passes into a braider 4 which functions to weave a hard steel wire 5 having a diameter of 0.26 to 0.56 mm into a bag-shaped braid for covering the tube 2 to reinforce it with the bag-shaped braid. In this case, the wire 5 penetrates into the softened ridges. When the ridges become hardened, the wire 5 is restrained by the tube 2 to provide a plastic tube 2a.

It is a matter of course that the plastic tube 2a thus obtained in itself may be used as a reinforced plastic hose.

In the present embodiment, the bag-shaped reinforcing layer of the braid reinforced tube 2a is heated by a high frequency heating device 6 and the tube 2a thus heated is covered with an outer layer extruded from an extruder 7 and formed of material which is the same as that of the tube 2 to provide a reinforced plastic hose 2b.

In the case of manufacturing a reinforced plastic hose provided with at least two reinforcing layers, the other reinforcing layers and outer layers may be superimposed about the existing outer layer in succession in the order as mentioned above.

Alternatively, the plastic tube 2 extruded from the tuber 1 and provided around its outer surface with the serrated portion may spirally be wound by the wire 5 to provide a spirally reinforced plastic hose 2b. In this case, the spirally reinforced plastic hose 2b may be provided with at least two reinforcing layers in the same manner as that described above with reference to the braided reinforced plastic hose.

FIG. 3a shows a braided reinforced plastic hose in section taken in its lengthwise direction and FIG. 3b shows a spirally reinforced plastic hose in section taken in its lengthwise direction. In the braided reinforced plastic hose shown in FIG. 3a, the plastic tube 2 is fused together with the outer layer 2c with a braided reinforcing layer 2d sandwiched therebetween.

In the reinforced plastic hose shown in FIG. 3b, the plastic tube 2 is fused together with the outer layer 2c with two spiral reinforcing layers 2d, 2d sandwiched therebetween.

FIG. 4a shows a conventional braided reinforced plastic hose in section taken in its lengthwise direction and FIG. 4b shows a conventional spirally reinforced plastic hose in section taken in its lengthwise direction.

In the conventional reinforced plastic hose shown in FIG. 4a, the plastic tube 2 is fused together with the outer layer 2c with a braided reinforcing layer 2d and also an air layer 2e sandwiched therebetween. In the conventional spirally reinforced plastic hose shown in FIG. 4b, the plastic tube 2 is fused together with the outer layer 2c with two reinforcing layers 2d, 2d and also a non-fused intermediate layer 2f sandwiched therebetween.

As seen from FIGS. 3a and 3b on the one hand and from FIGS. 4a and 4b on the other hand, the reinforced plastic hose according to the invention is capable of completely removing the air layer 2e or non-fused intermediate layer 2f present together with the reinforcing layer owing to the following reasons.

That is, in the method according to the invention, only the ridges of the plastic tube 2 are heated to soften them immediately before the arrangement of the reinforcing layer 2d. The tension on the wire 5 when it is applied to the plastic tube 2 causes the wire 5 to penetrate into the ridges of the plastic tube 2 without deforming the plastic tube body. In addition, the reinforcing layer 2d only is heated by the high frequency heating device 6 to melt that portion of the plastic tube 2 which makes contact with the wire 5. This causes the outer layer material to flow into the groove of the plastic tube 2 and into the air gap 2e or non-fused intermediate layer 2f remaining in the reinforcing layer 2d in a smooth manner.

This together with the presence of a uniform reinforcing layer obtained by the wire 5 penetrated into the ridges of the plastic tube 2 provides a reinforced hose having an excellent physical property.

As stated hereinbefore, the method according to the invention has the advantage that it is possible to restrain the wire from moving relative to the elastic tube and outer layer and can prevent friction between the two adjacent wires to improve the durability of the hose, that each wire of the reinforcing layer is surrounded by the plastic material to make it difficult to produce rust on the wire, that a metal fitting can easily be mounted on the cut end of the hose and that it is possible to prevent the hose from being entangled.

What is claimed is:

1. A method of manufacturing reinforced plastic hoses comprising the steps of: extruding and shaping plastic material into a plastic tube having a smooth inner surface and a longitudinally serrated outer surface comprising alternating raised ridges and recessed grooves, locally heating said plastic tube to soften only the ridges of the serrated outer surface while leaving the main body of said tube in a hardened state, applying a tensioned wire reinforcing layer to the softened outer surface of the tube, and embedding said tensioned wire reinforcing layer into the ridges of said softened outer surface.

2. The method according to claim 1, comprising further heating said reinforcing layer, and extruding an outer layer formed of plastic material which is the same as said tube plastic material to cover said reinforcing layer.

* * * * *